United States Patent [19]

Koyama et al.

[11] Patent Number: 5,277,479
[45] Date of Patent: Jan. 11, 1994

[54] ONE PIECE TYPE RESIN WHEEL

[75] Inventors: Haruo Koyama, Saitama; Youichi Nishimuro, Tokyo; Kunio Machida, Tokyo; Yoshihide Fukahori, Tokyo, all of Japan

[73] Assignee: Bridgestone Corporation, Tokyo, Japan

[21] Appl. No.: 896,875

[22] Filed: Jun. 10, 1992

Related U.S. Application Data

[63] Continuation-in-part of Ser. No. 813,658, Dec. 27, 1991, abandoned.

[30] Foreign Application Priority Data

Feb. 4, 1991 [JP] Japan .................................. 3-13325

[51] Int. Cl.$^5$ .............................................. B60B 5/02
[52] U.S. Cl. .................................... 301/64.7; 301/6.91
[58] Field of Search .................. 301/6.1, 6.91, 6.3, 301/9.1, 35.62, 35.54, 64.7, 65

[56] References Cited

U.S. PATENT DOCUMENTS

| | | | |
|---|---|---|---|
| 4,030,754 | 6/1977 | Merlette | 301/64.7 X |
| 4,444,435 | 4/1984 | Honsa | 301/63 PW |
| 4,483,729 | 11/1984 | Fujisaki et al. | 301/64.7 X |
| 4,511,184 | 4/1985 | Schauf et al. | 301/64.7 |
| 4,721,342 | 1/1988 | Daniels et al. | 301/64.7 |
| 4,900,097 | 2/1990 | Kostov et al. | 301/65 X |

FOREIGN PATENT DOCUMENTS

| | | | |
|---|---|---|---|
| 2248548 | 4/1973 | Fed. Rep. of Germany | 301/63 PW |
| 2513187 | 10/1975 | Fed. Rep. of Germany | 301/63 PW |
| 0067103 | 4/1984 | Japan | 301/64.7 |
| 0038101 | 2/1990 | Japan | 301/6 WB |
| 0128958 | 5/1990 | Japan | 301/63 PW |

*Primary Examiner*—Russell D. Stormer
*Attorney, Agent, or Firm*—Kanesaka and Takeuchi

[57] ABSTRACT

A resin wheel of a one piece wheel type comprising a rim and a disk molded integrally, in which a portion between an axle hole of the disk and the rim is in a form of a blind plate with no holes, and the wheel is formed by injection molding or injection compression molding of a fiber-reinforced thermoplastic resin. A resin wheel of a one piece wheel type comprising a rim and a disk molded integrally, in which a portion between an axle hole of the disk and the rim is in the form of a blind plate with no holes, excepting for bolt holes and the wheel is formed by injection molding or injection compression molding of a fiber-reinforced thermoplastic resin.

15 Claims, 4 Drawing Sheets

ONE PIECE TYPE RESIN WHEEL

This application is a continuation-in-part, of application Ser. No. 813,658, filed Dec. 27, 1991 now abandoned.

FIELD OF THE INVENTION

The present invention concerns a resin wheel and it, particularly, relates to a resin wheel which is excellent in mechanical properties such as impact resistance, bending strength, rigidity, heat resistance, wear resistance and creep resistance, light in weight and satisfactory in the mass productivity.

RELATED ART

Among wheels, car wheels, for example, have been generally manufactured with stainless steels or light alloys (aluminum alloy and magnesium alloy).

A stainless steel wheel is manufactured by press or roll molding but it involves a problem of often causing irregularities in the molding size and, in particular, tending to cause errors in the roundness of a bead sheet portion in a rim, as well as it is not satisfactory in the weight reduction of car parts since it is heavy in weight.

On the contrary, although a light metal wheel is stable in the molding size and the weight is reduced remarkably as less as ⅓ of the steel wheel in view of the weight, it has a drawback that the material cost is extremely expensive, that is, 3 to 5 times of the stainless steel wheel.

By the way, weight reduction of car parts is an extremely essential condition from a view point of energy saving, to which much importance has been said in recent years, and weight reduction is further desired, particularly, for unsprung parts such as a wheel in view of the improvement of the fuel cost and the enhancement of the maneuverability.

With such a background, a resin wheel has been proposed recently as a wheel capable of satisfying the weight reduction, molding stability and cost reduction. The resin wheel is molded by using, as the main material, FRP comprising a theremosetting resin mixed with reinforcing short fibers or long fibers, which is reduced in the weight and excellent in the stability of the molding size as compared with the metal wheel, as well as it is expected to be satisfactory also in the productivity to enable cost down for the products, and extremely excellent in view of the design property such as coloration.

As the characteristics required for such a resin wheel, there can be mentioned:

(1) high impact resistance in view of the prevention of destruction,
(2) small creep for preventing the tire from detaching the wheel,
(3) excellent heat resistance against the heat of a brake drum,
(4) excellent uniformity (molding products having an irregular or defective portion can not be used as a wheel since the wheel is one of important parts of a car, and
(5) possibility of mass production, By the way, the wheel generally comprises, as shown in FIG. 6 (cross sectional view for upper half) and FIG. 7 (perspective view), a rim 1 and a disk 2, in which an axle hole 3, hub bolt holes 4 and decorative holes 5 are provided in the disk 2. Then, commercially available aluminum wheels are generally classified, in view of the structure, into a one piece wheel comprising the rim 1 and the disk 2 molded integrally and a two piece wheel in which the rim 1 and the disk 2 are molded independently of each other and then both of them are coupled together by joining with metal bolts. The two piece wheel, as compared with the one piece wheel, has a great merit capable of providing wheels in a wide variety of combination by changing the design for the disk 2 while leaving the structure of the rim 1 identical. On the other hand, since the rim 1 and the disk 2 are joined, overlap portions have to be provided to both of them and, since the portions are joined by metal bolts, it has a drawback that the weight is increased as compared with the one piece wheel.

On the other hand, since the resin wheel naturally has a remarkable sales point in its reduced weight, the construction causing the increase of the weight is avoided as much as possible. Therefore, commercially available conventional resin wheels have been developed at present on the premise of taking a form of a one-piece wheel by compression molding of a thermosetting resin.

In view of the molding processes for the conventional resin wheel, a resin wheel manufactured by compression molding is excellent, for example, in the rigidity and the strength since fiber damages during molding are relatively small. In addition, since the resin used mainly comprises a thermosetting resin, heat resistance and creep resistance are also satisfactory. However, it is not suitable for molding products of complicate shapes (for example, those with remarkable changes in the wall thickness), and it has a drawback of poor productivity since the molding cycle is long.

On the contrary, although the injection molding method has extremely high productivity and is excellent in view of the production cost, it has a drawback in that injection molding products generally have a strength as low as ⅓ to 1/5 compared with that of compression molding products. This is attributable to that the physical properties of the material constituting the molding products became nonuniform or degraded to reduce the strength, caused by the occurrence of weld lines at the resin joining portion in a case where fibers and molecules are oriented and, in particular, holes, etc. are present in the products due to destruction and flow of fibers during kneading or flowing of the resin. Particularly, in a case of the wheel, as shown in FIG. 7, since a number of decorative holes 5 are disposed to the disk portion 2 from a view point of design and also for increasing the air cooling effect during rotation and, in addition, there are bolt holes 4 for clamping to a brake drum of a car main body, it results in such a shape as often inducing weld lines. Accordingly, a resin wheel manufactured through injection molding by using a thermoplastic resin has not yet actually been completed and marketed up to now.

OBJECT AND SUMMARY OF THE INVENTION

An object of the present invention is to overcome the foregoing problem in the prior art by eliminating decorative holes in a disk portion and provide a resin wheel excellent in mechanical properties such as bending strength, rigidity, impact resistance, heat resistance, wear resistance and creep resistance, reduced in the cost and capable of mass production.

The resin wheel as a first embodiment of the present invention has a feature in a one piece wheel comprising a rim and a disk molded integrally, in which a portion between an axle hole of the disk and the rim is formed in a shape of a blind plate with no holes, and obtained by injection molding or injection compression molding of a fiber-reinforced thermoplastic resin.

The resin wheel as a second embodiment of the present invention has a feature in a one piece wheel comprising a rim and a disk molded integrally, in which only bolt holes are formed between an axle hole of the disk and the rim, while other portions are left in a shape of a blind plate with no holes, and obtained by injection molding or injection compression molding of a fiber-reinforced thermoplastic resin.

The resin wheel according to the present invention is a one piece molding product obtained through an injection molding or injection compression molding method by using a mixture of a partial aromatic polyamide resin and a fiber- reinforced thermoplastic resin and has a structure with no decorative holes in the disk, for avoiding the reduction of strength caused by the occurrence of weld during molding. Although the resin wheel according to the present invention with no decorative holes is an injection molding or injection compression molding product using the mixture of the partial aromatic polyamide resin and the fiber-reinforced theremoplastic resin, it is excellent in the strength, as well as possesses merits of one piece molding products of the mixture of the partial aromatic polyamide resin and the fiber-reinforced theremoplastic resin, that is, reduced cost, reusability, reduced weight and mass productivity.

PREFERRED EMBODIMENTS

Descriptions will now be made specifically to preferred embodiments according to the present invention with reference to the drawings.

Figure 8:
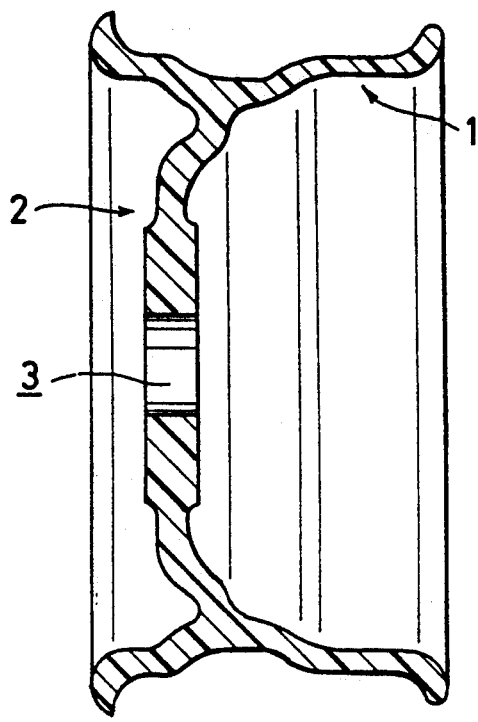
FIG. 8 is an entire cross sectional view of a wheel according to one embodiment.
Figure 9:
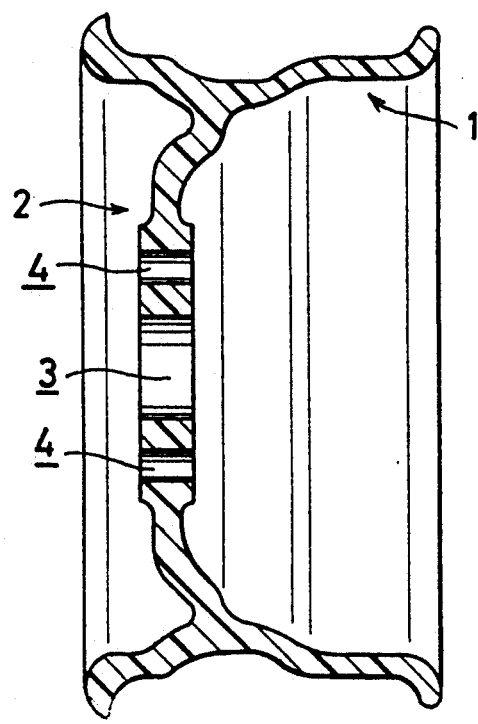
FIG. 9 is an entire cross sectional view of a wheel according to another embodiment.

In the resin wheel shown in FIG. 8, a portion between an axle hole 3 of a disk 2 and a rim 1 is formed as a blind plate with no holes. In the resin wheel shown in FIG. 9, only bolt holes 4 are formed between the axle hole 3 of the disk portion 2 and the rim portion 1, while leaving other portions in the shape of a blind plate with no holes. None of the resin wheels has decorative holes.

In the resin wheel according to the present invention as described above, it may be considered that an air cooling effect of the rotational shaft is reduced since there are no decorative holes. In view of the above, in the resin wheel according to the present invention, it is preferred to improve this drawback by the following countermeasures.

Figure 1:
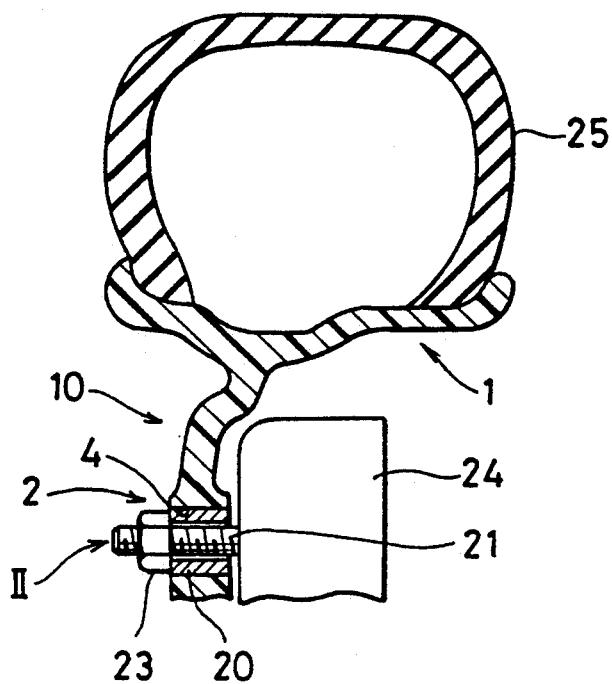
FIG. 1 is a cross sectional view illustrating a portion of a resin wheel according to the present invention.
Figure 2:
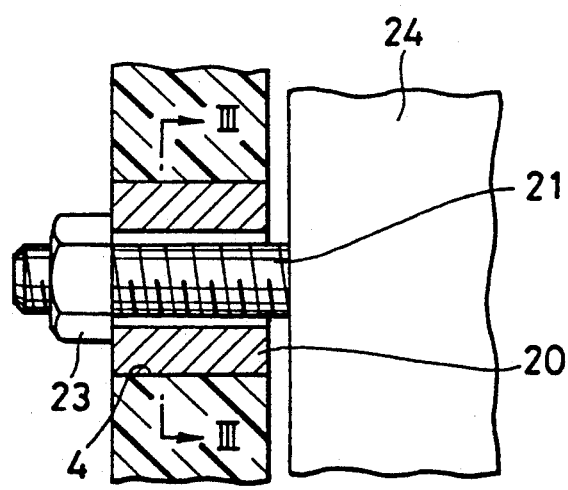
FIG. 2 is an enlarged view for a portion II in FIG. 1.
Figure 3:
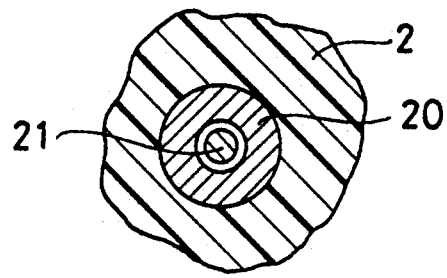
FIG. 3 is a cross sectional view taken along lines III—III in FIG. 2.

Referring to FIGS. 1 to 5 of the present invention, for instance, a wheel is usually attached by way of hub bolts to a disk adjacent to a brake drum or brake disk. Accordingly, the periphery of the hub bolt hole directly undergoes the effect of the heat generated by the brake, which causes stress relaxation accompanying the softening and creeping of the resin to slacken the hub during long time use. For overcoming the problem, it is preferred, for example, as shown in FIG. 1 (cross sectional view near the hub), FIG. 2 and FIG. 3 that a sleeve 20 having high rigidity, high strength and heat resistance together is fitted into a bolt hole 4 through which a hub bolt 21 of a resin wheel 10 is fitted and the clamping force of the nut 23 is transmitted by way of the sleeve 20 to a brake drum 24. In FIG. 1, 25 denotes a tire. In this case, metal, heat resistant plastic, glass fiber-reinforced heat resistant plastic, carbon fiber-reinforced carbon composite, ceramic, etc. are suitable as the material for the sleeve 20 to be fitted into the bolt hole 4.

Figure 4:
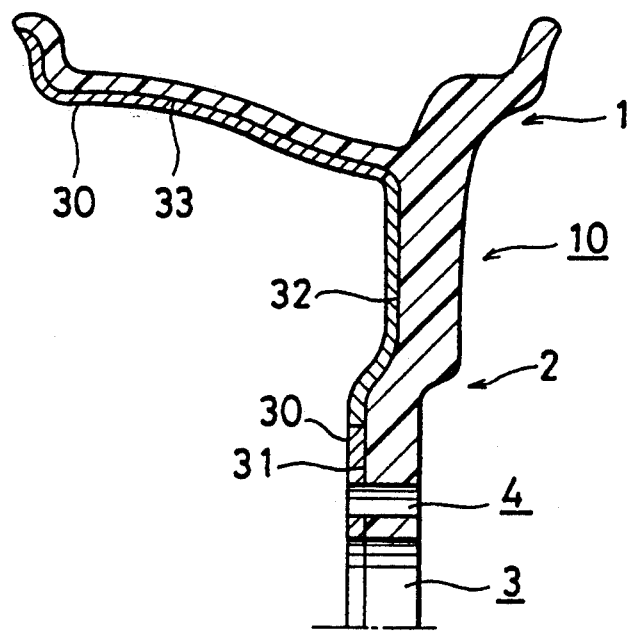
FIG. 4 is a cross sectional view illustrating another embodiment of the resin wheel according to the present invention.

Further, for shielding heat from the brake drum, a method of disposing a heat insulating material integrally to the surfaces of the disk and the rim on the side of the brake drum by means of insert molding or the like may be considered. In this case, such an improvement can be applied to a portion, for example, as shown in FIG. 4, a surface 31 as a portion of the disk 2 or the entire surfaces 31 and 32 of the disk 2. Further, the heat insulating material may be applied to a partial surface or the entire surface 33 of the rim 1. As the heat insulating material 30 used herein, there can be mentioned, for example, a plate-like material comprising a heat resistant plastic, ceramic or an inorganic material together with a reinforcing material thereof, a slate plate comprising asbestos or the like. Any material having heat insulating property and strength can be used.

As the reinforcing fibers to be blended with the synthetic resin in the present invention, there can be mentioned fibers of glass, carbon, graphite, aramide, polyethylene, ceramic (SiC, $Al_2O_3$, etc.), metal (boron, stainless steel, etc.). Among them, carbon and glass fibers are particularly effective. Referring to the diameter of the reinforcing fibers, if it is too small, no sufficient reinforcing effect can be attained. On the other hand, if it is too large, injection compression molding becomes difficult. Accordingly, the diameter of the reinforcing fibers is preferably from 0.1 to 100 $\mu$m, particularly preferably, from 0.5 to 50 $\mu$m.

If the blending amount of the reinforcing fibers is too small, no sufficient reinforcing effect can be attained, whereas if it is excessive, the matrix resin becomes insufficient to worsen the moldability. Accordingly, the blending amount of the reinforcing fibers to the molding material is, preferably, from 5 to 70% by volume and, particularly preferably, 10 to 60% by volume.

The thermoplastic resin and reinforcing fibers described above are kneaded in a kneading machine at a predetermined mixing ratio, and formed into a molding material in a shape of a grain which is called as a pellet. The length of the reinforcing fibers contained in the produced pellet is 0.1 to 0.5 mm, which is called as a short-fiber reinforced thermoplastic resin. This short-fiber reinforced thermoplastic resin is insufficient in strength. On the contrary, a long-fiber reinforced thermoplastic resin has fibers with lengths of more than 1 mm, preferably more than 2 mm, which is excellent in strength and moldability. The long-fiber reinforced thermoplastic resin can be produced as follows.

Rovings of the reinforcing fibers drawn out of bobbins are passed through molten thermoplastic resin at a low viscosity to impregnate the mono-filament surface with the resin. Then, the impregnated filaments are passed through a cooling pipe so that they are lined up in the drawing-out direction and solidified. Thus obtained continuous rovings impregnated with the thermoplastic resin are cut into a predetermined length to obtain a grain material of fibers. (Japanese Patent Application Laid-Open Publication No. 57-181852).

As described above, the length of the reinforcing fibers to be contained in the long-fiber reinforced thermoplastic resin can be adjusted as desired. For a wheel material, in a standpoint of strength, as the length of the fiber increases, the strength is effective. On the contrary, in a viewpoint of molding a product, as the length of the fiber increases, the fluidity of the resin is deteriorated, thus resulting in occurrence of voids and strong fiber orientation. Therefore, for preferable long-fiber reinforced thermoplastic resin material used in the present invention, rods having a diameter of 2.5 to 3 mm, produced by a pulsation as described above, are cut into grains of 1 to 30 mm, among which grains of 2 to 20 mm are preferable, above all, grains of 5 to 15 mm being optimum. Further, the resin can be impregnated sufficiently among the fibers although fibers are long since the material is molded by drawing. Further, the long fiber-reinforced resin of this kind has a remarkably improved mechanical property as compared with that of usual short fiber-reinforced resin with no deterioration of the moldability and fabricability and the same extents of moldability and fabricability are obtainable. Further, it is extremely effective to use a usual short fiber-reinforced resin in admixture in order to improve the fabricability or the like of the long fiber-reinforced material. In this case, the mixing ratio of the short fiber-reinforced resin is preferably less than 70% and, more desirably, less than 60% by weight of the entire amount.

The resin wheel according to the present invention can be manufactured with ease by integrally molding such a fiber-reinforced thermoplastic resin by means of injection molding or injection compression molding.

The injection compression molding process referred to in the present invention means such a method of previously opening molding dies slightly or closing them with a weak mold clamping force, injecting the material therein and then applying compression molding while increasing the mold clamping force. In particular, a molding method of injecting a molten resin into upper and lower dies disposed between presses by means of an injecting cylinder or an extruder, and closing the dies after or before completion of the resin supply, suitable as the injection compression molding method referred to in the present invention.

By the way, energy saving has been keenly advocated in recent years due to a demand for social circumstance and reduction of the weight has been desired also for car parts as described above. In particular, reduction of the weight has been demanded for the undersprung members since a remarkable effect is obtainable and also in view of the maneuverability.

The thermoplastic resins constituting the resin wheel according to the present invention can include various types of polyamide resins, such as, Nylon 6,6, Nylon 4,6, Nylon 6,10, Nylon 10, Nylon 11, Nylon 12 aromatic polyamide, polybutylene terephthalate (PBT), polyphenylene sulfide (PPS), acetal resin (POM), polycarbonate (PC), polyethylene terephthalate (PET), polypropylene (PP), polyether sulfone (PES), polysulfone (PSF), Polyether ether ketone (PEEK), polyphenylene oxide (PPO), polyamideimide (PAI), polyamide (PI), polyester, as well as various kinds of liquid crystalline polymers. Among them, various kinds of polyamide resins, PBT, PPS, POM, PC, PES, PI, PAI, PEEK, polyester and various kinds of liquid crystalline polymers are preferred. Since the material for the wheels of the present invention is required to have certain heat resistance, it is especially preferable to use a partial aromatic polyamide resin wherein aromatic groups are partially substituted for main chains of aliphatic polyamide. The ordinary nylon resins, such as Nylon 6, Nylon 6,6, Nylon 6,10, Nylon 12 and Nylon 46, are most popular as engineering plastics for use in construction and use requiring strength. However, since these nylon resins are insufficient in heat resistance and water absorptivity, their uses are greatly limited. On the contrary, the partial aromatic polyamide resin contains an appropriate amount of aromatic units in the main chains. Therefore, although the partial aromatic polyamide possesses high rigidity, it has excellent moldability because of its good thermally melting property. Thus, the products molded by the partial aromatic-polyamide resin have also better heat resistance and water absorptivity than those of products molded by the ordinary nylons. Further, since a basic structure of the polymer is an amide-bond, the partial aromatic polyamide resin is available at a cost equal to those of the ordinary nylons. The partial aromatic polyamide resin may be used for impregnating the short and long fibers. Such thermoplastic resins may be used alone or as a mixture of two or more of them.

The above-mentioned synthetic resin may also be blended with a required amount of various kinds of filler, anti-aging agent, cross-linker, oil, plasticizer, oligomer and elastomer, with an aim of improving the weather proofness, heat resistance, wear resistance, flowing property, heat expansion property, flame retardancy and chemical resistance.

In view of the above, it is preferred to further combine a reinforcing structure for the improvement of the strength, and a weight-reducing structure. The above-mentioned structures may be introduced into an entire wheel, only to the rim or the disk portion, as well as to other necessary portions appropriately.

Figure 5:
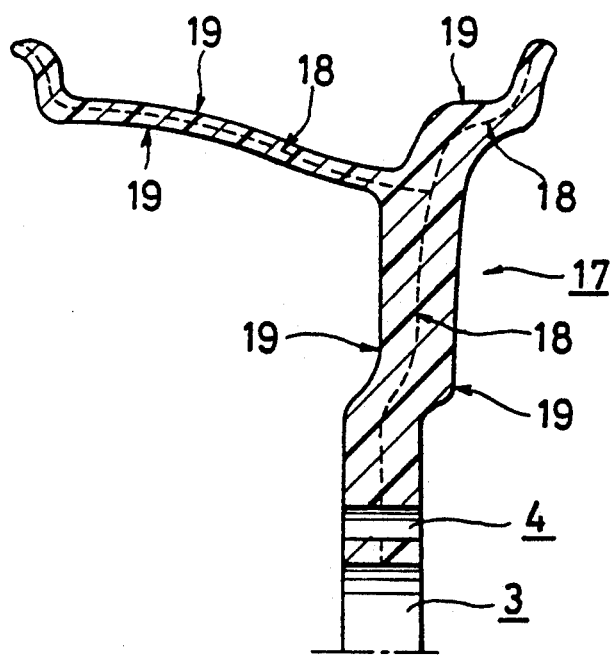
FIG. 5 is a cross sectional view illustrating a further embodiment of the resin wheel according to the present invention.
Figure 6:
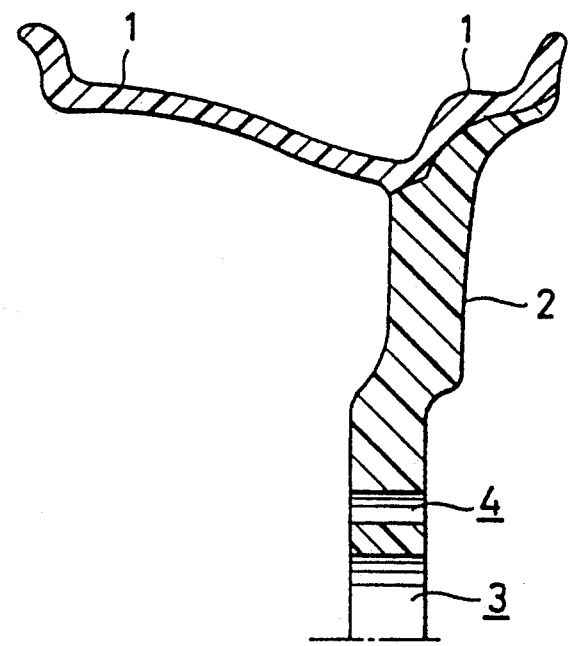
FIG. 6 is a cross sectional view of a conventional resin wheel.
Figure 7:
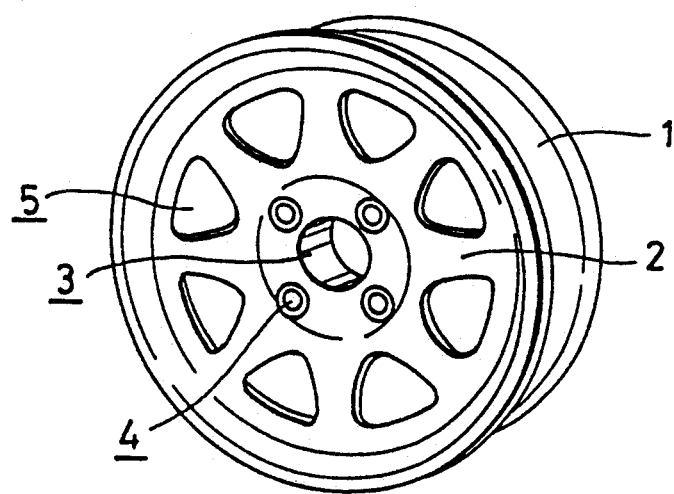
FIG. 7 is a perspective view of a conventional resin wheel.

For example, as shown in FIG. 5, a certain kind of a reinforcing layer, specifically, a layer containing an increased blending amount of the reinforcing fibers, or a reinforcing member may be disposed as the reinforcing structure at the intermediate portions 18 of the entire wheel 17. The reinforcing layer may be disposed also to the surfaces 19.

In this case, a material used for the reinforcing layer can include, for example, glass, carbon, graphite, aramide, ceramic (SiC, $Al_2O_3$ or the like) and metal (boron or stainless steel). As the form of the reinforcement, one directional long fiber such as roving, cloth, braid, twisted wire, net, linear or plate-like product prepared by arranging them and solidifying with a resin (FRP), as well as three-dimensional fabrics are most suitable.

In a case of filling and disposing the reinforcing layer in the wheel, it is advantageous to adapt insert molding of previously molding a filling material of a predetermined shape and then injection molding the material while disposing it at a predetermined position of the molding die.

The resin wheel according to the present invention also has a merit that a device having a different function can be embedded in the wheel and molded integrally. For instance, safety car under-parts constituted integrally with a wheel and a tire can be provided, by embedding an abnormality alarm such as the puncture alarm into the wheel and applying integral molding. Further, a fail safe mechanism formed such as by erection of a rib to the rim portion of a wheel can easily be molded integrally with the wheel.

In a case where decorative holes are necessary in the resin wheel according to the present invention, such decorative holes can be provided by subsequent the molded product, for example, by cutting fabrication after molding. This enables to avoid the reduction of the strength due to welding.

As has been described above, specifically, the resin wheel according to the present invention has a remarkably excellent weight-reducing structure and a reinforcing structure having advantageous effects, for example, (1) it is reduced in the weight and excellent in the property such as bending strength, impact resistance, rigidity, heat resistance, wear resistance, creep resistance, etc.

(2) it has excellent uniformity in the quality of the product, and (3) it has excellent mass productivity, enabling to reduce the cost of the product. According to the present invention, a resin wheel of extremely high practical usefulness can be provided.

The resin wheel according to the present invention as described above is suitable as a wheel for automobiles in a narrow meaning, such as passenger car, bus or track, a well as a wheel for automobiles in a broad meaning, such as, railway vehicle, subway vehicle, linear motor car vehicle, air craft, autobicycle, bicycle and recreation go cart used, for example, in golf course or amusement park.

What is claimed is:

1. A one piece type resin wheel comprising a rim and a disk integrally molded together as one unit, said disk having an axle hole and an area extending from the axle hole to said rim, said area being in a form of a blind plate without holes, said wheel being formed of a mixture of a thermoplastic resin, a long-fiber reinforced thermoplastic resin, and a short-fiber reinforced thermoplastic resin by one of injection molding and injection compression molding methods, a length of said long-fibers being 1 to 30 mm, a length of said short-fibers being 0.1 to 0.5 mm, and a blending amount of the fibers to the resin being between 5 and 70% by volume and a mixing ratio of said short-fiber reinforced resin being less than 70% by weight of a total amount.

2. A wheel as defined in claim 1, wherein a heat insulating material is disposed at least to portions at surfaces of the disk and the rim on a side of a brake drum.

3. A wheel as defined in claim 1, wherein the reinforcing fiber comprises at least one of glass, carbon, graphite, aramide, polyethylene, ceramic and metal.

4. A wheel as defined in claim 1, wherein the resin is at least one selected from nylon 6, nylon 6,6, nylon 4,6, nylon 6,10, nylon 10, nylon 11, nylon 12, aromatic polyamide, polybutylene terephthalate (PBT), polyphenylene sulfide (PPS), acetal resin (POM), polycarbonate (PC), polyethylene terephthalate (PET), polypropylene (PP), polyether sulfone (PES), polysulfone (PSF), polyester ether ketone (PEEK), polyphenylene oxide (PPO), polyamideimide (PAI), polyimide (PI), polyester and various kinds of liquid crystalline polymers.

5. A wheel as defined in claim 1, wherein the thermoplastic resin is a partial aromatic polyamide resin.

6. A wheel as defined in claim 1, wherein said resin is one member selected from nylon 6·10 and aromatic polyamide.

7. A one piece type resin wheel comprising a rim and a disk integrally molded together as one unit, said disk having an axle hole and an area extending from the axle hole to said rim, said area being in a form of a blind plate with only bolt holes, said wheel being formed of a mixture of a thermoplastic resin, a long-fiber reinforced thermoplastic resin, and a short-fiber reinforced thermoplastic resin by one of injection molding and injection compression molding methods, a length of said long-fibers being 1 to 30 mm, a length of said short-fibers being 0.1 to 0.5 mm, and a blending amount of the fibers to the resin being between 5 and 70% by volume and a mixing ratio of said short-fiber reinforced resin being less than 70% by weight of a total amount.

8. A wheel as defined in claim 7, wherein sleeves having high rigidity, high strength and heat resistance are fitted into the bolt holes.

9. A wheel as defined in claim 7, wherein a heat insulating material is disposed at least to portions at surfaces of the disk and the rim on a side of a brake drum.

10. A wheel as defined in claim 7, wherein the reinforcing fiber comprises at least one of glass, carbon, graphite, aramide, polyethylene, ceramic and metal.

11. A wheel as defined in claim 7, wherein the resin is at least one selected from nylon 6, nylon 6,6, nylon 4,6, nylon 6,10, nylon 10, nylon 11, nylon 12, aromatic polyamide, polybutylene terephthalate (PBT), polyphenylene sulfide (PPS), acetal resin (POM), polycarbonate (PC), polyethylene terephthalate (PET), polypropylene (PP), polyether sulfone (PES), polysulfone (PSF), polyether ether keton (PEEK), polyphenylene oxide (PPO), polyamideimide (PAI), polyimide (PI), polyester and various kinds of liquid crystalline polymers.

12. A wheel as defined in claim 7, wherein the thermoplastic resin is a partial aromatic polyamide resin.

13. A wheel as defined in claim 7, wherein said resin is one member selected from nylon 6·10 and aromatic polyamide.

14. A one piece type resin wheel having a rim and a disk formed by the steps comprising, preparing rods containing long-fibers impregnated with a thermoplastic resin, each rod having a diameter of 2.5 to 3 mm and a length of 1 to 30 mm, and pellets containing short-fibers impregnated with a thermoplastic resin, each short-fiber having a length of 0.1 to 0.5 mm, mixing a resin, the rods and the pellets so that a blending amount of the fibers to the resin is between 5 and 70% by volume and a mixing ratio of said short-fiber reinforced resin is less than 70% by weight of a total amount, said resin being selected from nylon 6·10 and aromatic polyamide, and integrally molding the wheel as one unit by one of injection molding method and injection compression molding method so that said disk has an axle hole and an area extending from the axle hole to said rim in a form of a blind plate.

15. A one piece type resin wheel comprising a rim and a disk integrally molded together as one unit by one of injection molding method and injection compression molding method, said disk having an axle hole and an area extending from the axle hole to said rim, said area being in a form of a blind plate, said wheel being formed of a mixture of a thermoplastic resin, rods containing long-fibers impregnated with a thermoplastic resin, each rod having a diameter of 2.5 to 3 mm and a length of 1 to 30 mm, and pellets containing short-fibers impregnated with a thermoplastic resin, each short-fiber having a length of 0.1 to 0.5 mm, a blending amount of the fibers to the resin being between 5 and 70% by volume, a mixing ratio of said short-fiber reinforced resin being less than 70% by weight of a total amount, and said resin being selected from nylon 6·10 and aromatic polyamide.

* * * * *